(12) United States Patent
Uenishi et al.

(10) Patent No.: US 11,642,748 B2
(45) Date of Patent: May 9, 2023

(54) MACHINING PROGRAM CREATION METHOD, WORKPIECE MACHINING METHOD, AND MACHINE TOOL CONTROL DEVICE

(71) Applicant: FANUC CORPORATION, Yamanashi (JP)

(72) Inventors: Daisuke Uenishi, Yamanashi (JP); Tomohiro Oyamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/758,508

(22) PCT Filed: Jan. 18, 2021

(86) PCT No.: PCT/JP2021/001482
§ 371 (c)(1),
(2) Date: Jul. 7, 2022

(87) PCT Pub. No.: WO2021/149639
PCT Pub. Date: Jul. 29, 2021

(65) Prior Publication Data
US 2023/0051567 A1    Feb. 16, 2023

(30) Foreign Application Priority Data
Jan. 23, 2020   (JP) .............................. JP2020-008988

(51) Int. Cl.
*B23Q 15/12*         (2006.01)
*B23C 3/18*          (2006.01)
*G05B 19/4093*       (2006.01)

(52) U.S. Cl.
CPC ................ *B23Q 15/12* (2013.01); *B23C 3/18* (2013.01); *G05B 19/40931* (2013.01); *G05B 2219/35086* (2013.01)

(58) Field of Classification Search
CPC ...................................................... B23Q 15/12
See application file for complete search history.

(56) References Cited

U.S. PATENT DOCUMENTS

2016/0052071 A1*  2/2016  Ochiai ...................... B23C 3/18
                                                            409/132

FOREIGN PATENT DOCUMENTS

CH           661678 A5    8/1987
DE     102010060220 A1    5/2012
(Continued)

OTHER PUBLICATIONS

International Search Report issued in PCT/JP2021/001482; dated Mar. 30, 2021.

*Primary Examiner* — Jason L Vaughan
*Assistant Examiner* — Amanda Kreiling
(74) *Attorney, Agent, or Firm* — Studebaker & Brackett PC

(57) ABSTRACT

In the high-efficiency machining of blade parts according to the present invention, there is no reversal of the operating direction of a rotating shaft, and a high-quality machined surface can be obtained rapidly. A machining program is created for a workpiece such that: when a part having a convex curved surface and a concave curved surface, with a pair of edge portions as a boundary, is removal-machined, a virtual convex curve, the curvature of which is not inverted with respect to the convex curved surface, with the curves of the pair of edges as the tangent line, is set for the concave curved surface; a drive surface, for defining tool orientation without curvature inversion, is created by using the virtual convex curve, the convex curve set on the convex curved surface, and the convex curves set on the pair of edges; and (Continued)

a tool axis direction during removal machining is set on the basis of the normal direction of the drive surface for tool orientation definition.

9 Claims, 13 Drawing Sheets

(56) References Cited

FOREIGN PATENT DOCUMENTS

| | | | |
|---|---|---|---|
| JP | 2000-263309 | A | 9/2000 |
| JP | 2003-165012 | A | 6/2003 |
| JP | 2013-103290 | A | 5/2013 |
| WO | 2014/181418 | A1 | 11/2014 |

* cited by examiner

MACHINING PROGRAM CREATION METHOD, WORKPIECE MACHINING METHOD, AND MACHINE TOOL CONTROL DEVICE

TECHNICAL FIELD

The present invention relates to a machining program creation method, a workpiece machining method, and a machine tool control device.

BACKGROUND ART

In machining of a blade component such as a turbine blade employed for a jet engine, a cutting machine having a rotation axis, such as a five-axis machining center, is used. Generally, the blade component is in a thin plate shape, and one of front and back surfaces of the blade component is formed as a convex surface and the other surface is formed as a concave surface.

In machining of the blade component by the cutting machine, rough machining with a miller, semi-finishing with a radius end mill, and finishing with a ball end mill are mainly employed. For the thin low-rigidity shape of the blade component, high-efficiency removal machining for carving the blade component from a workpiece all at once by means of, e.g., a tapered ball end mill or a ball end mill is employed. Removal machining is performed while a tool is moving relative to the workpiece (see, e.g., Patent Document 1). Generally, a machining program for such removal machining is created targeted for a solid body of the blade component by means of a surface of the solid body.

Patent Document 1: Japanese Unexamined Patent Application, Publication No. 2003-165012

DISCLOSURE OF THE INVENTION

Problems to be Solved by the Invention

However, in the case of finishing the blade component with a high efficiency, the following problem is caused. FIG. 12 shows the blade component in a section perpendicular to a longitudinal axis direction (a direction perpendicular to the plane of paper of FIG. 11). The section of the blade component 1 includes four curves (arcs or spline curves) of a convex surface 11a, a concave surface 11b, an edge portion 1a (a trailing edge), and an edge portion 1b (a leading edge). The concave surface 11b is formed such that the curvature thereof is inverted from those of the convex surface 11a and the edge portions 1a, 1b.

Typically, in a machining program for such a blade component 1, a tool axis direction Ta is set to the direction of normal to these four curves. However, a curvature direction of the concave surface 11b is inverted when the blade component 1 rotates about the longitudinal axis direction relative to the tool T, and for this reason, the machining program has such a program configuration that the direction of operation of a rotation axis rotating the blade component 1 in a machine tool is reversed upon removal machining. As a result, there is a risk of increased machining time and machined surface defects due to tooling marks caused by a decrease in speed and an increase in reversal errors due to reversal of the direction of operation of the rotation axis.

On the other hand, a machining program has been proposed, which defines, as shown in FIG. 13, a direction about the longitudinal axis 12 of the blade component 1 as the tool axis direction Ta to reduce reversal of the direction of operation of the rotation axis without using the surface obtained from the solid body targeted for machining for definition of the tool posture. However, in the case of setting the tool axis direction Ta to a direction about a one-direction vector such as the longitudinal axis 12 of the blade component 1, machining of the blade component 1 in the thin plate shape is such machining that a tip end of the tool T at a circumferential speed of zero is used to poke the workpiece from the tool axis direction Ta, and therefore, leads to a machined surface defect due to vibration of the tool T and insufficient chip discharging and is not practical.

For this reason, a machining program creation method, a workpiece machining method, and a machine tool control device configured so that a high-quality machined surface can be obtained at high speed without the need for reversing the direction of operation of a rotation axis in high-efficiency blade component machining have been demanded.

Means for Solving the Problems

A machining program creation method according to one aspect of the present disclosure is a machining program creation method for machining a component having a convex surface and a concave surface with respect to a pair of edge portions from a workpiece by removal machining, the method including setting, for the concave surface, a virtual convex curve whose curvature is not inverted from that of the convex surface with reference to tangents to curves of the pair of edge portions, creating a tool posture defining drive surface by means of the virtual convex curve, a convex curve set for the convex surface, and convex curves set for the pair of edge portions such that the curvature of the tool posture defining drive surface is not inverted, and creating a machining program for setting a tool axis direction upon removal machining with reference to the direction of normal to the tool posture defining drive surface.

A workpiece machining method according to one aspect of the present disclosure is a workpiece machining method for machining a component having a convex surface and a concave surface with respect to a pair of edge portions from a workpiece by removal machining, the method including setting, for the concave surface, a virtual convex curve whose curvature is not inverted from that of the convex surface with reference to tangents to curves of the pair of edge portions, creating a tool posture defining drive surface by means of the virtual convex curve, a convex curve set for the convex surface, and convex curves set for the pair of edge portions such that the curvature of the tool posture defining drive surface is not inverted, setting a tool axis direction upon removal machining with reference to the direction of normal to the tool posture defining drive surface, and determining a tool posture based on the tool axis direction to machine the component from the workpiece by removal machining.

A machine tool control device according to one aspect of the present disclosure is a control device of a machine tool for machining a component having a convex surface and a concave surface with respect to a pair of edge portions from a workpiece by removal machining, the control device including a tool posture defining drive surface creation unit that sets, for the concave surface, a virtual convex curve whose curvature is not inverted from that of the convex surface with reference to tangents to curves of the pair of edge portions and creates a tool posture defining drive surface by means of the virtual convex curve, a convex curve set for the convex surface, and convex curves set for the pair of edge portions such that the curvature of the tool posture defining drive surface is not inverted, and a machining program creation unit that creates a machining program for setting a tool axis direction upon removal machining with reference to the direction of normal to the tool posture defining drive surface.

Effects of the Invention

According to one aspect, the machining program creation method, the workpiece machining method, and the machine tool control device configured so that a high-quality machined surface can be obtained at high speed without the need for reversing the direction of operation of the rotation axis in high-efficiency blade component machining can be provided.

PREFERRED MODE FOR CARRYING OUT THE INVENTION

Figure 1:
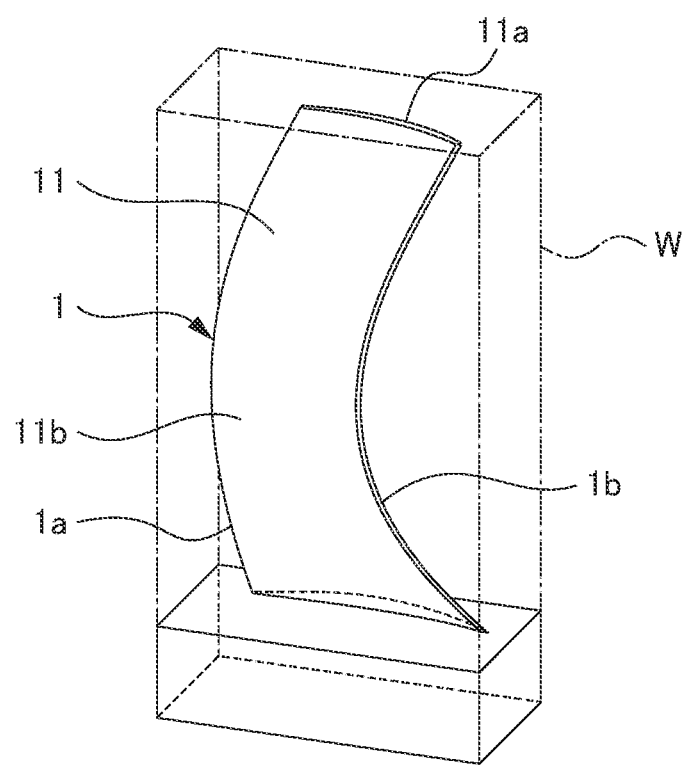
FIG. 1 is a perspective view showing a blade component machined from a workpiece by removal machining.

Hereinafter, one aspect of the present disclosure will be described in detail with reference to the drawings. As shown in FIG. 1, a blade component 1 is formed in such a manner that an unnecessary portion is removed from a rectangular parallelepiped workpiece W by a tool (not shown in FIG. 1) of a machine tool. The blade component 1 has blade surfaces 11 formed as front and back curved surfaces with respect to a pair of edge portions 1a, 1b of trailing and leading edges arranged at both end portions in a width direction. Of the blade component 1, one blade surface 11 is a convex surface 11a, and the other blade surface 11 is a concave surface 11b. The blade component 1 is, for example, a turbine or compressor blade.

Figure 2:
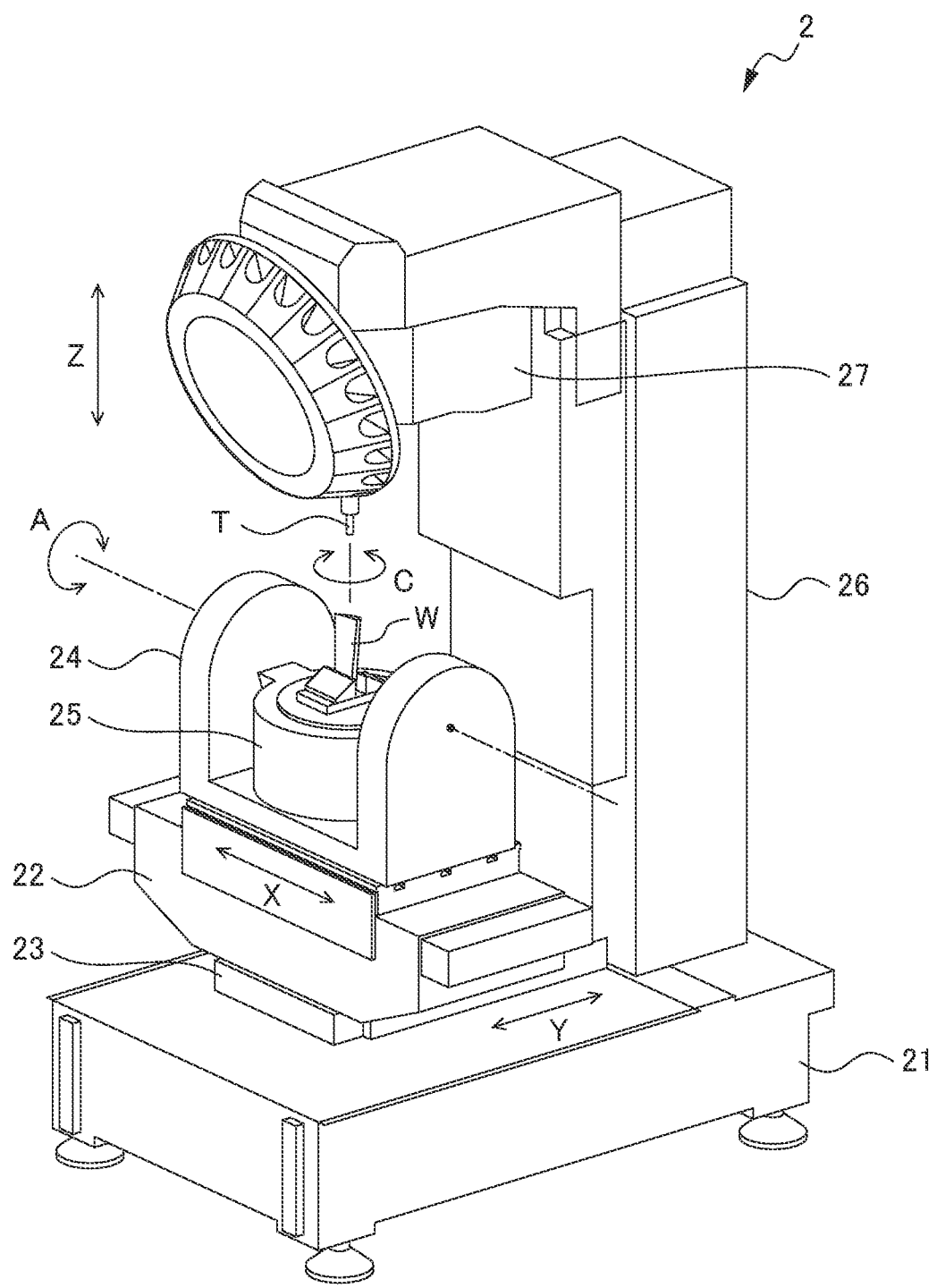
FIG. 2 is a perspective view showing one embodiment of a machine tool.
Figure 3:
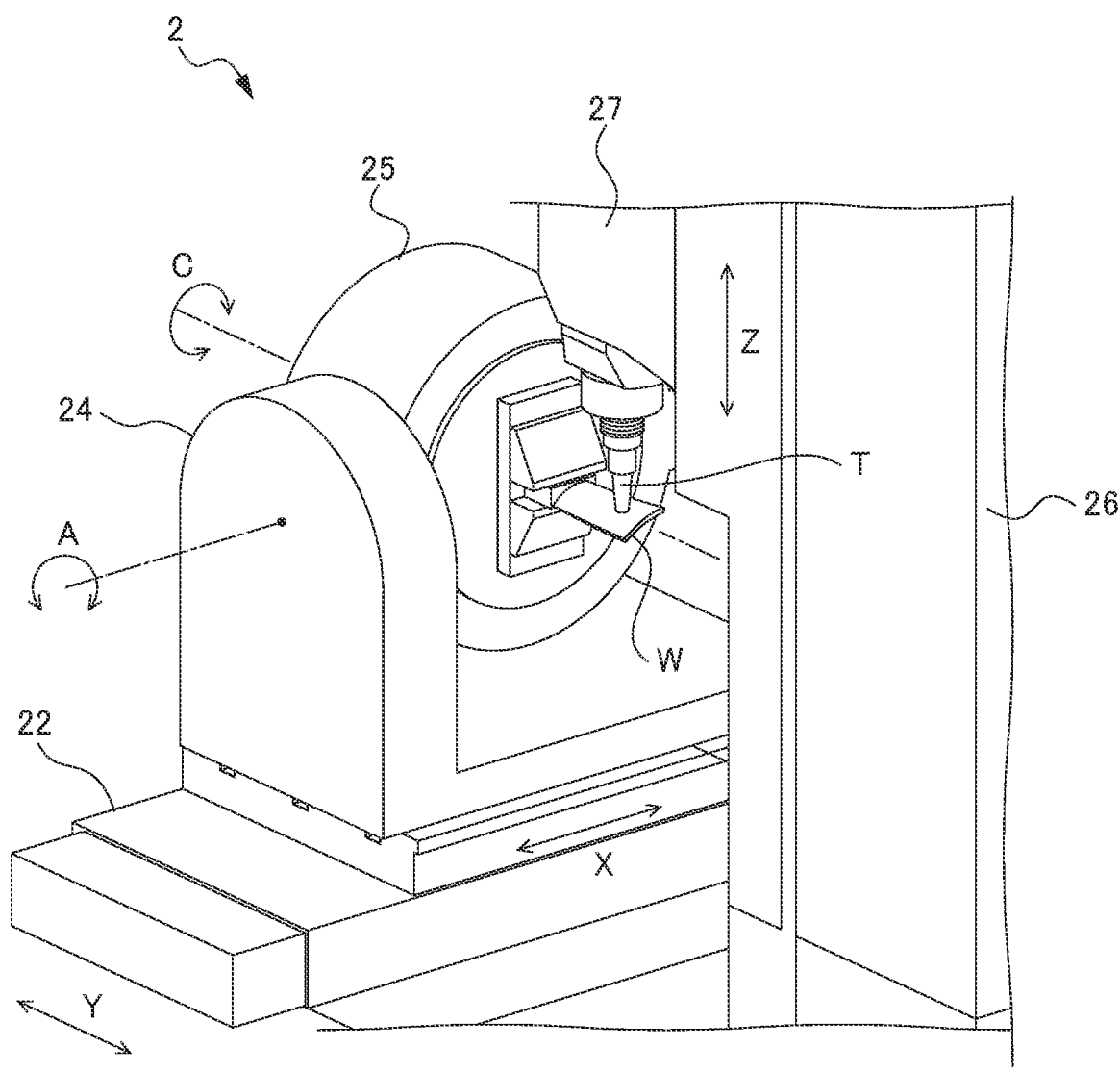
FIG. 3 is a perspective view showing, in closeup, a state in which a blade surface of the blade component is machined by removal machining by the machine tool shown in FIG. 2.

One embodiment of the machine tool used when such a blade component 1 is machined from the workpiece W by removal machining will be described with reference to FIGS. 2 and 3. The machine tool 2 includes, on a base 21 placed on a floor, an X-axis table 22 that linearly moves in an X-axis direction and a Y-axis table 23 that linearly moves in a Y-axis direction perpendicular to the X-axis direction.

A rotary table 24 is mounted on an upper surface of the X-axis table 22. The rotary table 24 rotatably supports a rotation axis 25. The rotation axis 25 is member that holds the workpiece W, and rotates the held workpiece W about a C-axis. The workpiece W is attached to the rotation axis 25 such that a longitudinal axis direction of the machined blade component 1 is parallel with the direction of the C-axis.

The rotary table 24 rotates (inclines) the rotation axis 25 itself about an A-axis. The A-axis of the rotary table 24 is arranged parallel with the X-axis direction. The C-axis of the rotation axis 25 is arranged on a plane perpendicular to the X-axis direction. Thus, the A-axis of the rotary table 24 serves as an inclination axis about which the C-axis of the rotation axis 25 is inclined along the plane perpendicular to the A-axis.

A column 26 stands on an upper surface of the base 21. A main axis unit 27 that can move up and down along a Z-axis direction perpendicular to the X-axis direction and the Y-axis direction is provided at an upper end portion of the column 26. The tool T is attached to a lower end portion of the main axis unit 27. The tool T machines, by removal machining, the blade component 1 from the workpiece W rotating about the C-axis by operation of the rotation axis 25 based on a predetermined machining program. For example, a ball end mill, a tapered ball end mill, or a radius end mill is used as the tool T.

Figure 4:
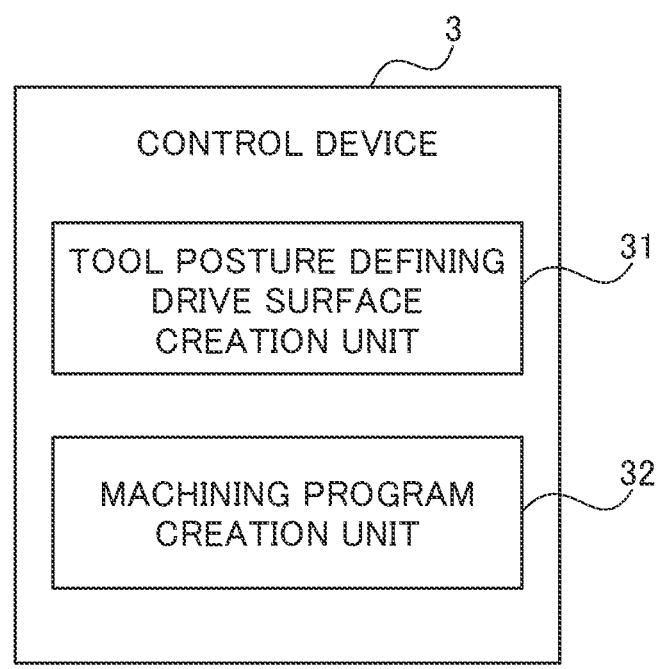
FIG. 4 is a block diagram showing the configuration of a control device of the machine tool.

FIG. 4 shows one embodiment of a control device 3 of the machine tool 2. The control device 3 has a tool posture defining drive surface creation unit 31 that creates a drive surface for defining a tool posture and a machining program creation unit 32 that creates the machining program based on the tool posture defining drive surface (hereinafter merely referred to as a drive surface) created by the tool posture defining drive surface creation unit 31.

Figure 5:
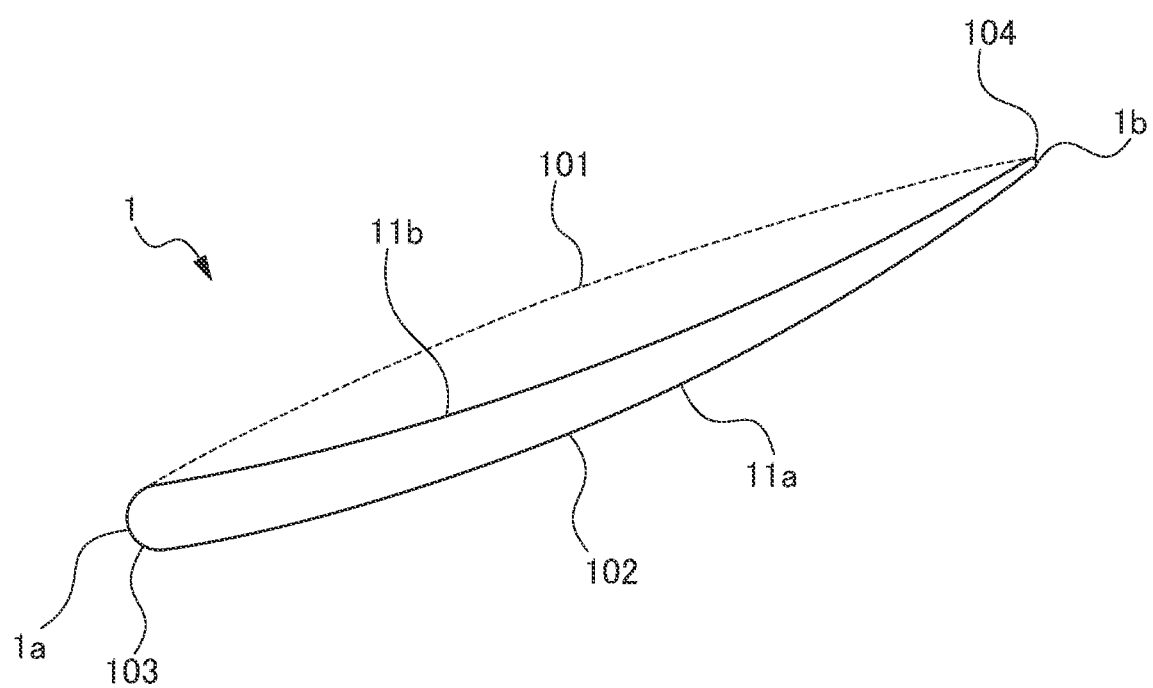
FIG. 5 is a view for describing one embodiment of the method for creating a tool posture defining drive surface for the blade component.

FIG. 5 shows a drive surface creation method in the tool posture defining drive surface creation unit 31. In FIG. 5, the blade component 1 is shown in a section perpendicular to the longitudinal axis direction (a direction perpendicular to the plane of paper of FIG. 5) of the blade component 1. The tool posture defining drive surface creation unit 31 sets a machining target to a solid body of the blade component 1, and as shown in FIG. 5, sets a virtual convex curve 101 formed as an arc or a spline curve for the concave surface 11b of the blade component 1 having the convex surface 11a and the concave surface 11b.

The virtual convex curve 101 is a curve set along the outer circumference of the sectional shape perpendicular to the longitudinal axis direction of the blade component 1. Specifically, the virtual convex curve 101 is set so as to protrude outward of the blade component 1 along the outer circumference of the sectional shape perpendicular to the longitudinal axis direction of the blade component 1 with reference to tangents to minute curves of the pair of edge portions 1a, 1b of the blade component 1. Thus, the virtual convex curve 101 is a curve whose curvature is not inverted from that of the convex surface 11a.

Figure 6:
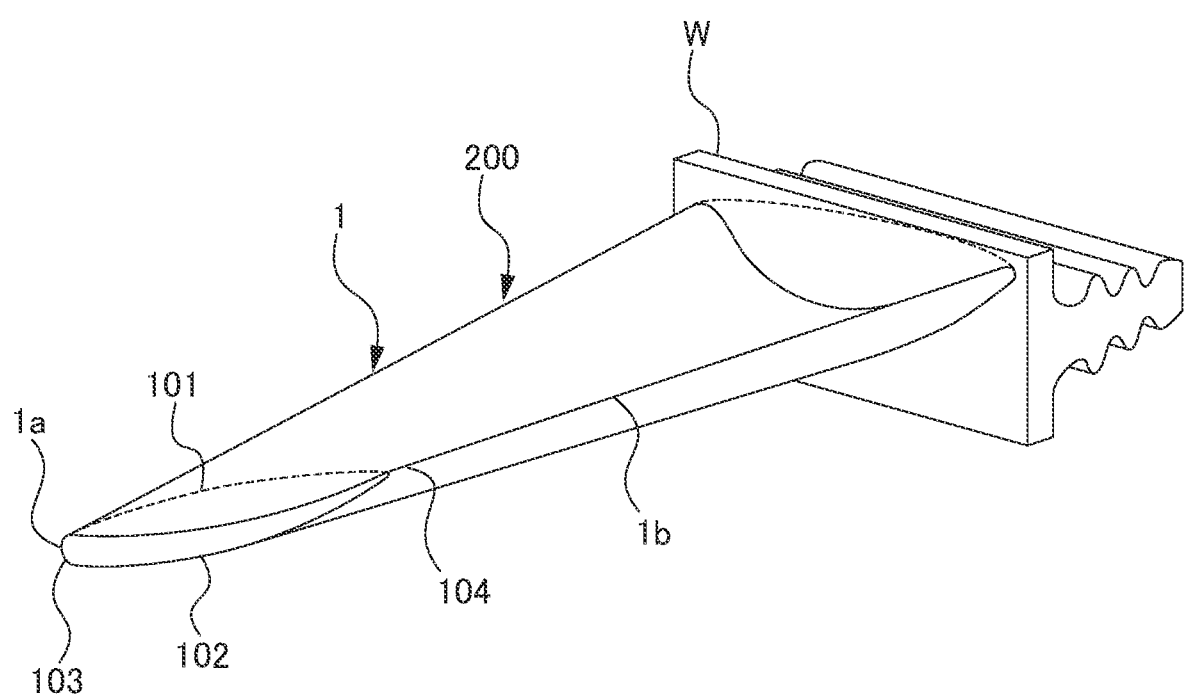
FIG. 6 is a view showing one embodiment of the tool posture defining drive surface for the blade component.

Accordingly, in the tool posture defining drive surface creation unit 31, four convex curves including the virtual convex curve 101 set for the concave surface 11b, a convex curve 102 set by the convex surface 11a, and convex curves 103, 104 set by surfaces of the pair of edge portions 1a, 1b are set at the outer circumference of the blade component 1 as shown in FIG. 5. The curvature is not inverted among these four convex curves. The tool posture defining drive surface creation unit 31 sets these four convex curves (the virtual convex curve 101 for the concave surface 11b, the convex curve 102 for the convex surface 11a, the convex curves 103, 104 for the edge portions 1a, 1b), and thereafter, creates the drive surface 200 for defining the tool posture by means of these four convex curves as shown in FIG. 6.

Figure 7:
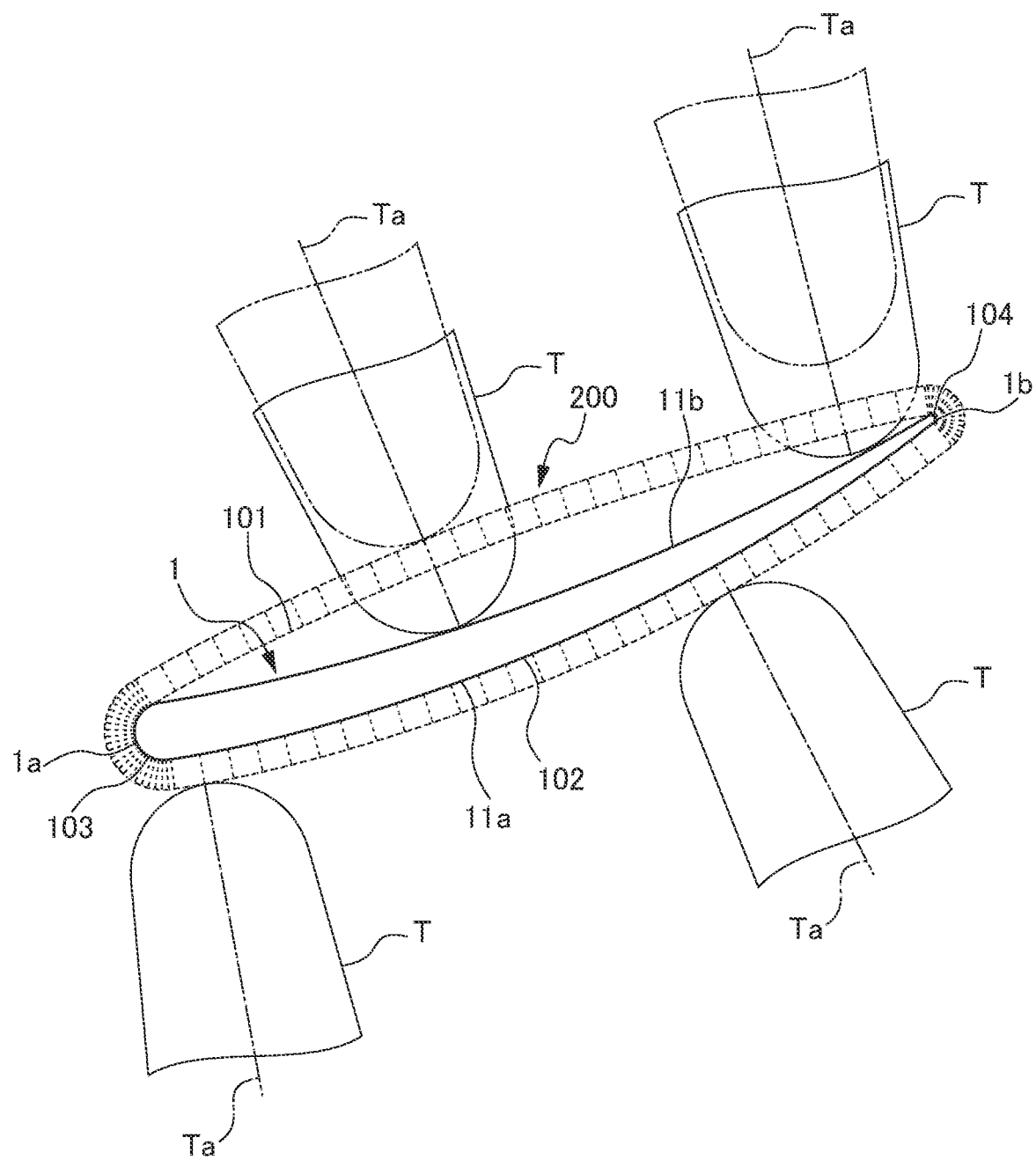
FIG. 7 is a view for describing a curvature direction of the tool posture defining drive surface shown in FIG. 6 and a workpiece machining method.

The machining program creation unit 32 creates, as shown in FIG. 7, the machining program for setting a tool axis direction Ta with reference to the direction of normal to the drive surface 200 created in the tool posture defining drive surface creation unit 31. The tool axis direction Ta shown in FIG. 7 is arranged along the direction of normal to the drive surface 200. Since the curvature directions of the four convex curves (the virtual convex curve 101 for the concave surface 11b, the convex curve 102 for the convex surface 11a, the convex curves 103, 104 for the edge portions 1a, 1b) set in the tool posture defining drive surface creation unit 31 are all the same as each other, the posture of the tool T determined based on the tool axis direction Ta does not change on any of the convex curves of the drive surface 200 to such an extent that the direction of operation of the rotation axis 25 needs to be reversed.

The machine tool 2 determines the tool posture based on the machining program created by the machining program creation unit 32, and as shown in FIG. 7, machines the blade component 1 from the workpiece W by removal machining by the tool T in a state in which the tool posture is maintained. The tool axis direction Ta with respect to the concave surface 11b at this point is set based on the drive surface 200 created using the virtual convex curve 101, and therefore, the direction of operation of the rotation axis 25 is not reversed from that of the convex surface 11a upon removal machining for the concave surface 11b. Thus, a decrease in a machining speed and an increase in reversal error can be suppressed when the blade component 1 is machined by removal machining while the workpiece W is rotating by operation of the rotation axis 25, and the blade component 1 having a high-quality machined surface with no tooling marks can be machined at high speed.

The convex curve 102 of the drive surface 200 set for the convex surface 11a of the blade component 1 is generally connected to the convex curves 103, 104 set for the edge portions 1a, 1b without changing the curvature direction in many cases. However, depending on the shape of the blade component 1, even the convex curve 102 set for the convex surface 11a includes an error upon model conversion by means of computer aided design (CAD)/computer aided manufacturing (CAM) in some cases. As a result, the direction of operation of the rotation axis 25 is reversed upon removal machining of the convex surface 11a in some cases.

Figure 8:
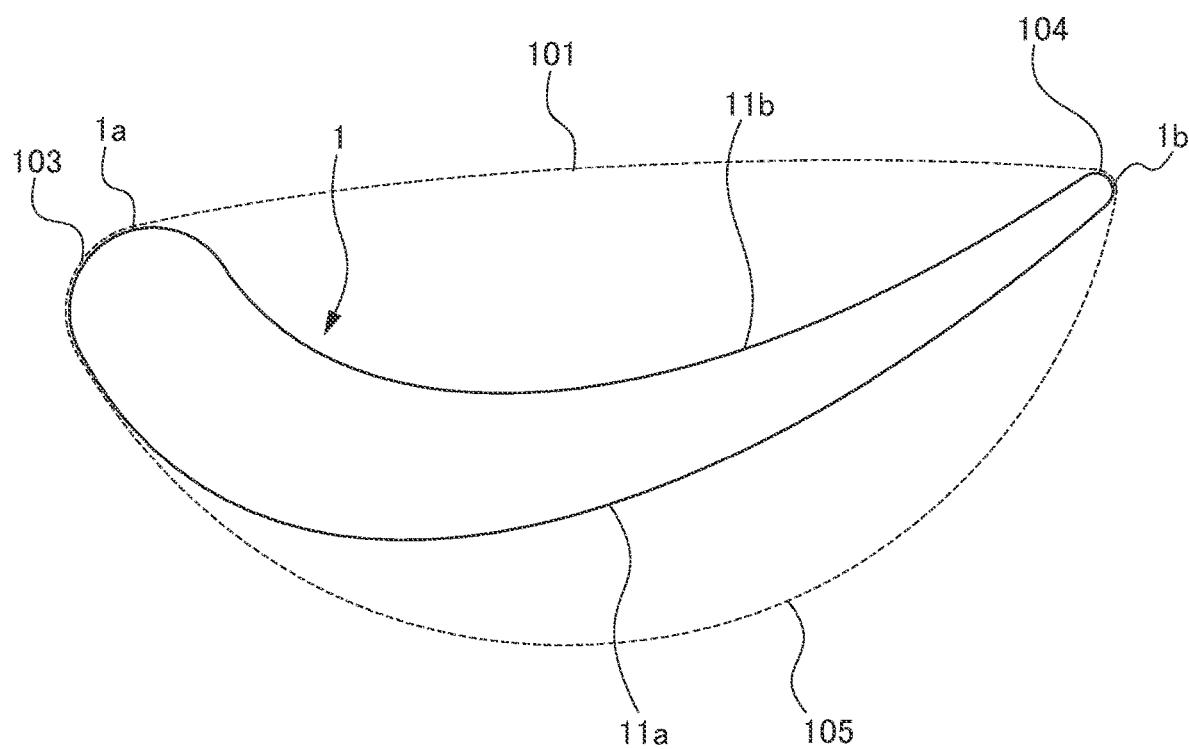
FIG. 8 is a view for describing another embodiment of the method for creating a tool posture defining drive surface for the blade component.
Figure 9:
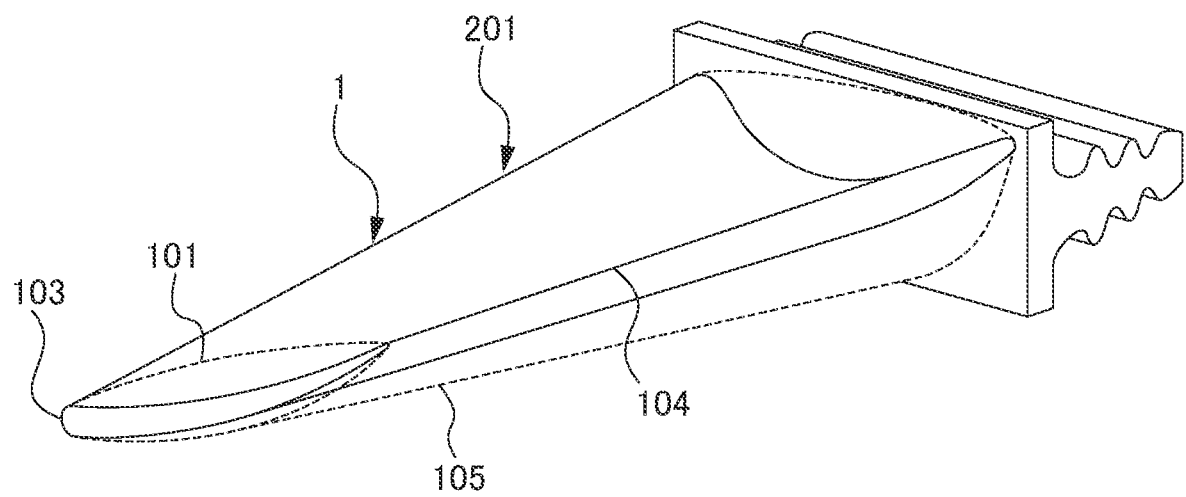
FIG. 9 is a view showing another embodiment of the tool posture defining drive surface for the blade component.
Figure 10:
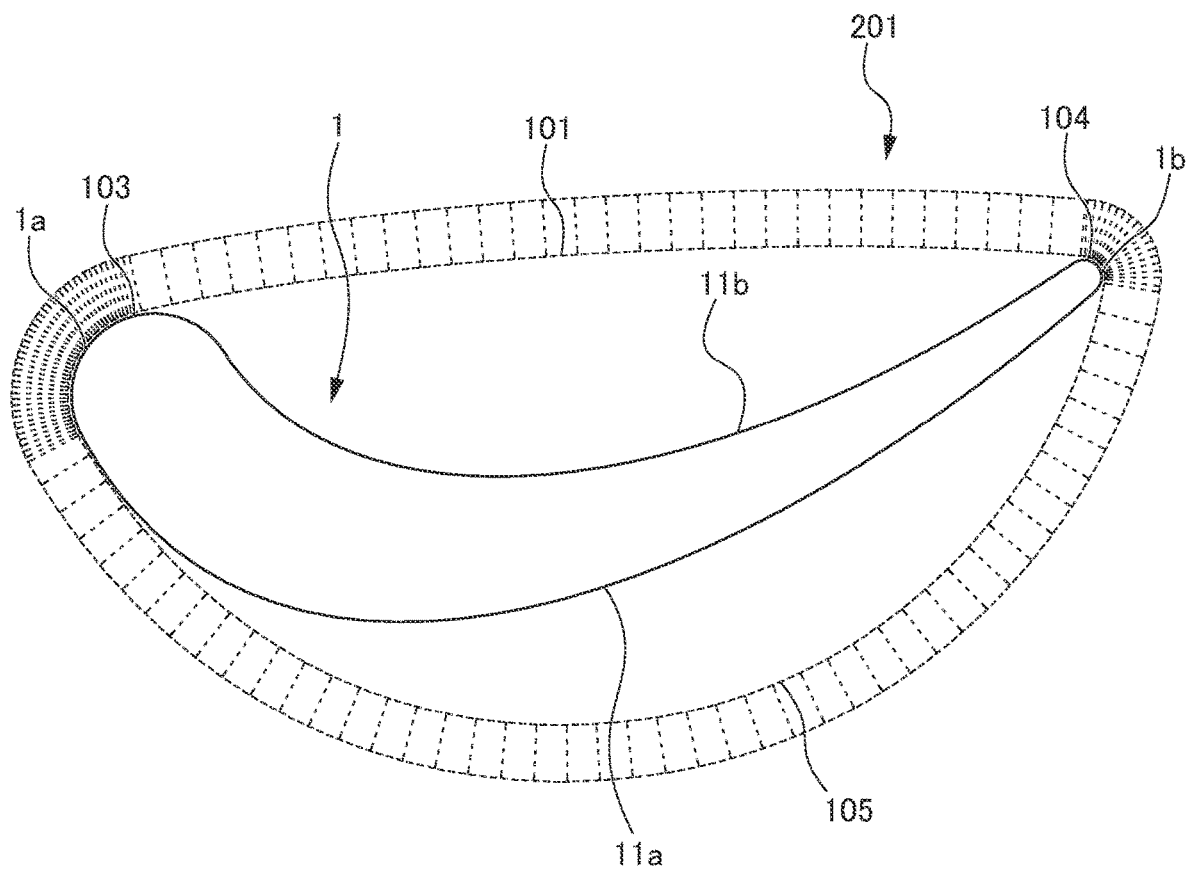
FIG. 10 is a view for describing the curvature direction of the tool posture defining drive surface shown in FIG. 9.

In this case, as shown in FIGS. 8, 9, and 10, the tool posture defining drive surface creation unit 31 may also create, for the convex surface 11a, a drive surface 201 with a virtual convex curve 105 as in the concave surface 11b, the virtual convex curve 105 being formed as an arc or a spline curve with reference to the tangents to the minute curves of the edge portions 1a, 1b. FIGS. 8 and 9 also show the blade component 1 in the section perpendicular to the longitudinal axis direction (a direction perpendicular to the plane of paper of FIGS. 8 and 9) of the blade component 1. Thus, the virtual convex curve 105 set for the convex surface 11a forms a convex curve protruding outward of the blade component 1 with respect to the convex surface 11a designed for the blade component 1 and formed smoothly continuously to the minute curves of the edge portions 1a, 1b. Thus, even if the shape of the blade component 1 is such a shape that the direction of operation of the rotation axis 25 needs to be reversed upon removal machining of the convex surface 11a, the direction of operation of the rotation axis 25 does not need to be reversed.

For the pair of edge portions 1a, 1b, in a case where the error is caused upon model conversion by means of the CAD/CAM, the tool posture defining drive surface creation unit 31 may create the drive surface 200 or the drive surface 201 based on a convex curve with reference to tangents to the convex curve 102 or the virtual convex curve 105 set for the convex surface 11a and the virtual convex curve 101 set for the concave surface 11b.

Figure 11:
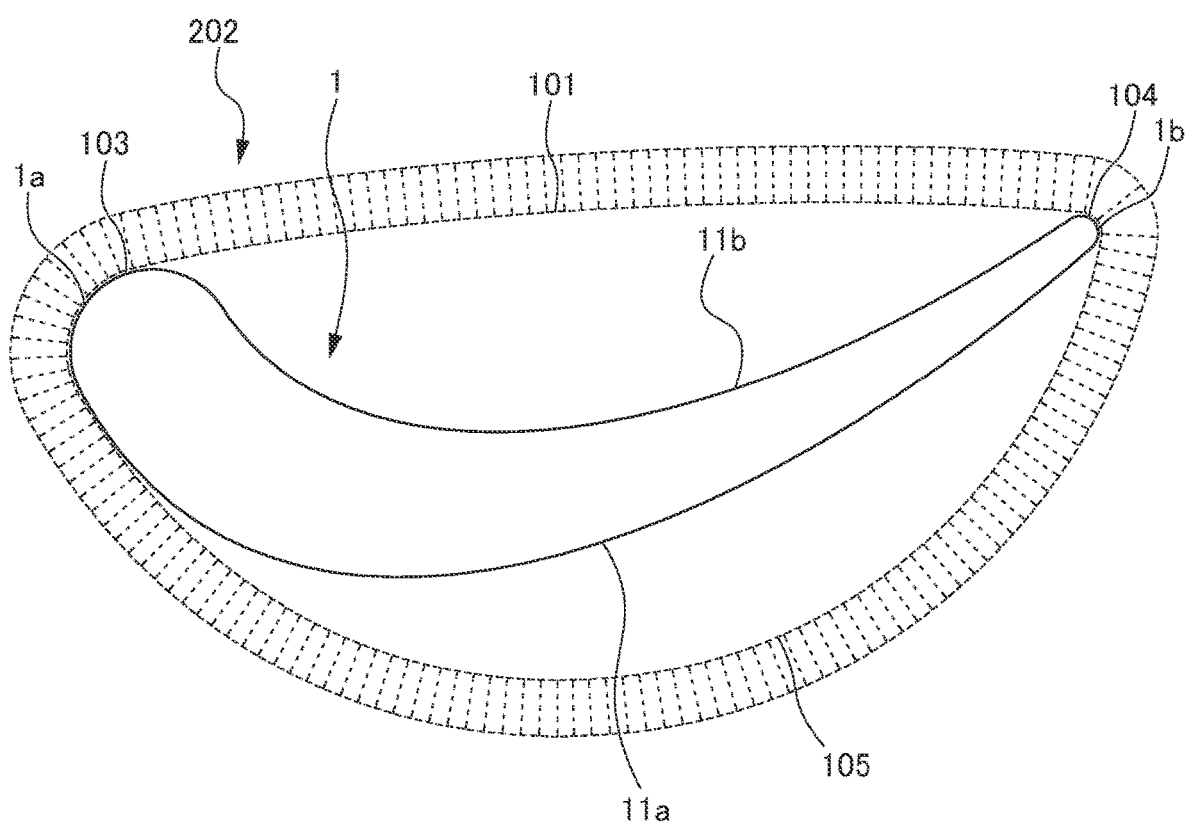
FIG. 11 is a view for describing still another embodiment of the method for creating a tool posture defining drive surface for the blade component.
Figure 12:
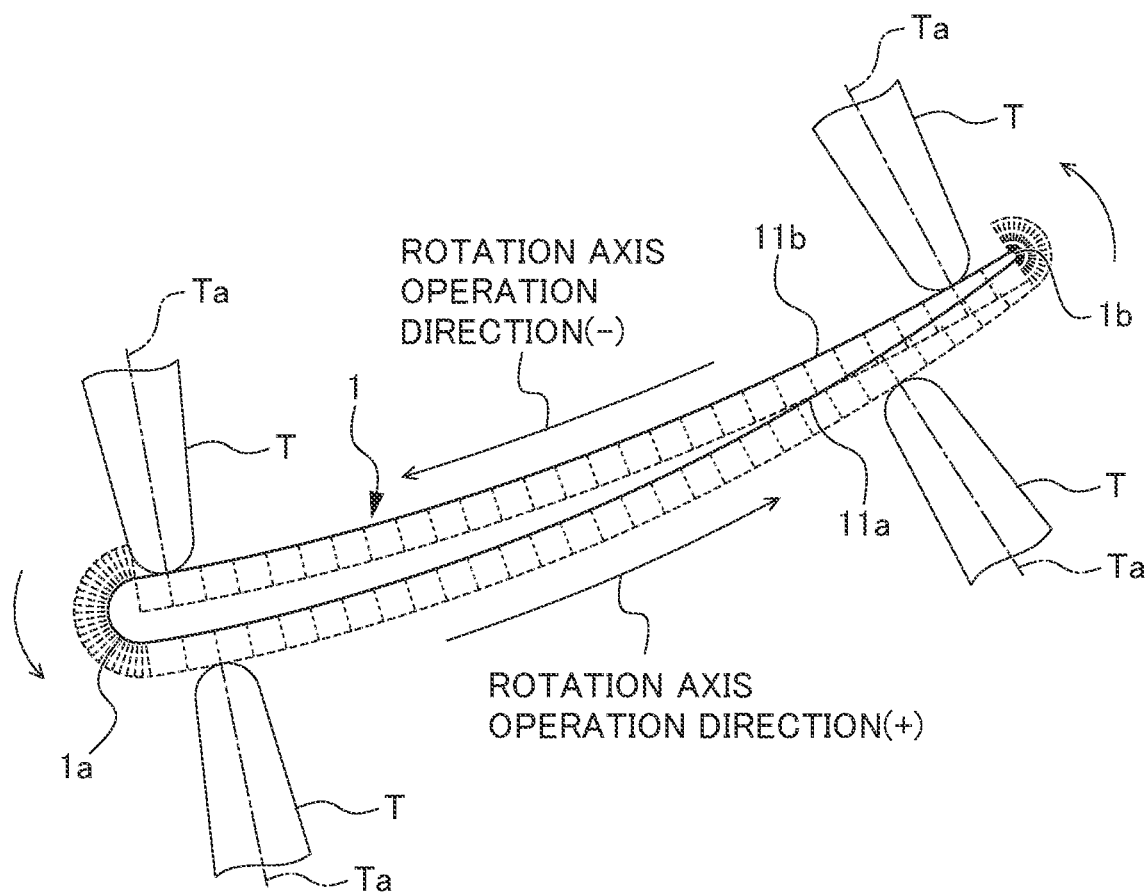
FIG. 12 is a view for describing a typical workpiece machining method.
Figure 13:
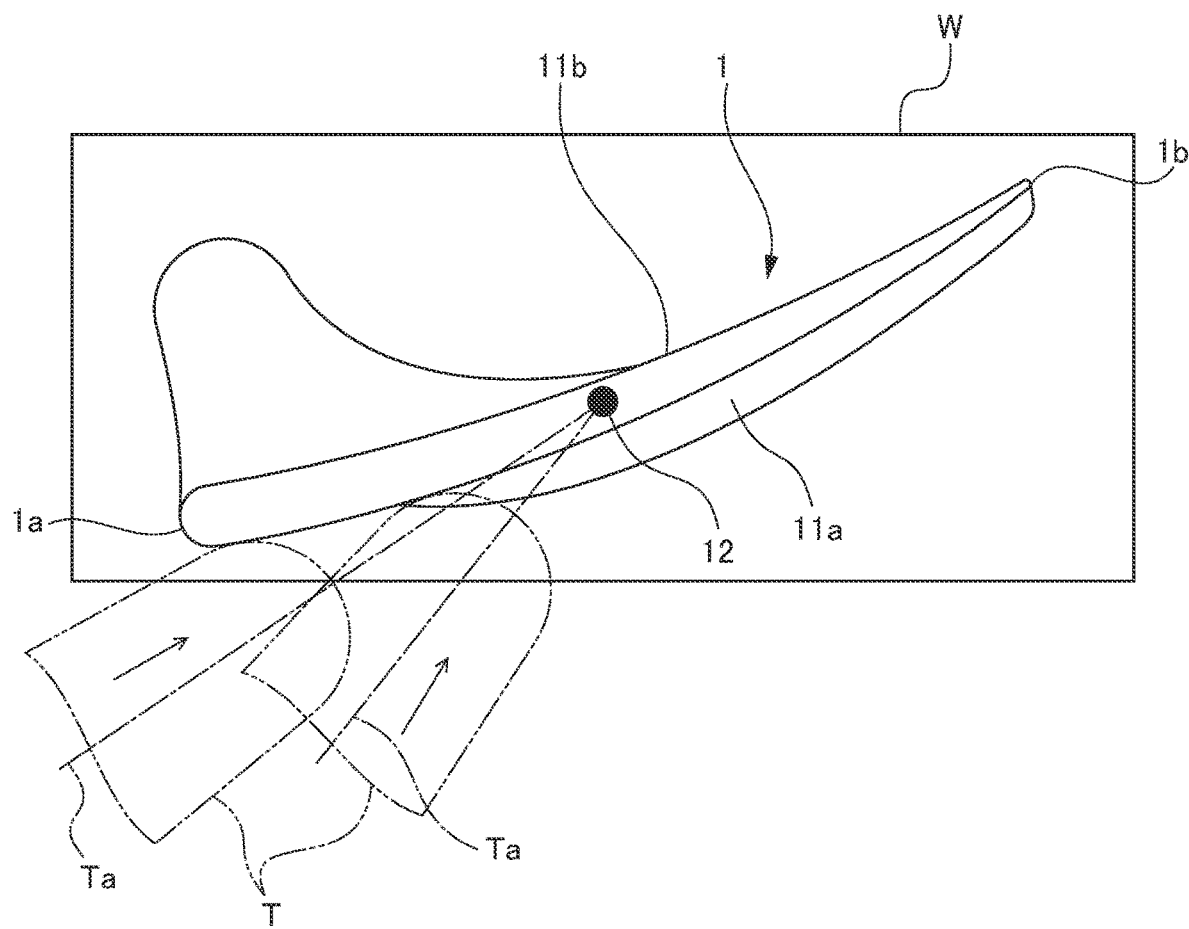
FIG. 13 is a view for describing the typical workpiece machining method.

In the case of setting the virtual convex curve 105 for the convex surface 11a, the tool posture defining drive surface creation unit 31 may connect, as shown in FIG. 11, all convex curves set for the blade component 1, i.e., the virtual convex curve 101 set for the concave surface 11b, the virtual convex curve 105 set for the convex surface 11a, and the convex curves 102, 103 set for the edge portions 1a, 1b, thereby creating a drive surface 202 having a single smoothly-continuous spline curve. This can generate a curve defining a tool axis change with a constant pitch, reduce a rapid change in the tool posture, and improve a machined surface quality.

Note that the above-described tool posture defining drive surface creation unit 31 creates the drive surface 200, 201, 202 based on the curves of the convex surface 11a and the concave surface 11b of the blade component 1. However, the tool posture defining drive surface creation unit 31 may create a drive surface formed such that a convex curve is further added to the center of a convex surface or a drive surface formed using a plurality of convex surfaces generated from sections equally divided in the longitudinal axis direction of the blade component 1. Accordingly, a machining program realizing a smoother tool axis change (operation of the rotation axis 25) can be created.

For further improving the machined surface quality, it is preferred that a tip end of the tool T at a circumferential speed of zero does not cut a machining surface of the workpiece W when the blade component 1 is machined from the workpiece W by removal machining. Thus, the posture of the tool T may be set in a state in which at least one of a lead angle or a tilt angle is inclined with respect to the tool axis direction Ta. The lead angle is an angle between a tool traveling direction and a tool axis on a plane parallel with the tool traveling direction. The tilt angle is an angle between the tool traveling direction and the tool axis on a plane perpendicular to the tool traveling direction. At least one of the lead angle or the tilt angle is, for the posture of the tool T, inclined upon removal machining for the workpiece W by means of the tool T, and therefore, the tip end of the tool T at a circumferential speed of zero does not cut the surface across the entire machining surface of the workpiece W, i.e., the entire surface of the blade component 1. Thus, the machined surface quality can be further improved.

EXPLANATION OF REFERENCE NUMERALS

1 Blade Component
1a, 1b Edge Portion
11a Convex Surface
11b Concave Surface
101 Virtual Convex Curve
102, 103, 104 Convex Curve

200, 201, 202 Tool Posture Defining Drive Surface
2 Machine Tool
3 Control Device
31 Tool Posture Defining Drive Surface Creation Unit
32 Machining Program Creation Unit
Ta Tool Axis Direction
W Workpiece

The invention claimed is:

1. A machining program creation method for machining a component having a convex surface and a concave surface with respect to a pair of edge portions from a workpiece by removal machining, comprising:
    setting, for the concave surface, a virtual convex curve whose curvature is not inverted from that of the convex surface with reference to tangents to curves of the pair of edge portions;
    creating a tool posture defining drive surface by means of the virtual convex curve, a convex curve set for the convex surface, and convex curves set for the pair of edge portions such that a curvature of the tool posture defining drive surface is not inverted; and
    creating a machining program for setting a tool axis direction upon removal machining with reference to a direction of normal to the tool posture defining drive surface.

2. The machining program creation method according to claim 1, wherein a tool posture is set in a state in which at least one of a lead angle or a tilt angle is inclined with respect to the tool axis direction.

3. The machining program creation method according to claim 1, wherein the component is a turbine or compressor blade.

4. A workpiece machining method for machining a component having a convex surface and a concave surface with respect to a pair of edge portions from a workpiece by removal machining, comprising:
    setting, for the concave surface, a virtual convex curve whose curvature is not inverted from that of the convex surface with reference to tangents to curves of the pair of edge portions;
    creating a tool posture defining drive surface by means of the virtual convex curve, a convex curve set for the convex surface, and convex curves set for the pair of edge portions such that a curvature of the tool posture defining drive surface is not inverted;
    setting a tool axis direction upon removal machining with reference to a direction of normal to the tool posture defining drive surface; and
    determining a tool posture based on the tool axis direction to machine the component from the workpiece by removal machining.

5. The workpiece machining method according to claim 4, wherein the tool posture is set in a state in which at least one of a lead angle or a tilt angle is inclined with respect to the tool axis direction.

6. The workpiece machining method according to claim 4, wherein the component is a turbine or compressor blade.

7. A control device of a machine tool for machining a component having a convex surface and a concave surface with respect to a pair of edge portions from a workpiece by removal machining, comprising:
    a tool posture defining drive surface creation unit that sets, for the concave surface, a virtual convex curve whose curvature is not inverted from that of the convex surface with reference to tangents to curves of the pair of edge portions and creates a tool posture defining drive surface by means of the virtual convex curve, a convex curve set for the convex surface, and convex curves set for the pair of edge portions such that a curvature of the tool posture defining drive surface is not inverted; and
    a machining program creation unit that creates a machining program for setting a tool axis direction upon removal machining with reference to a direction of normal to the tool posture defining drive surface.

8. The control device of the machine tool according to claim 7, wherein in the machining program creation unit, a tool posture is set in a state in which at least one of a lead angle or a tilt angle is inclined with respect to the tool axis direction.

9. The control device of the machine tool according to claim 7, wherein the component is a turbine or compressor blade.

* * * * *